Oct. 21, 1952 — F. D. COOMBS — 2,615,122
ILLUMINATED LEVEL
Filed Jan. 20, 1950 — 2 SHEETS—SHEET 2
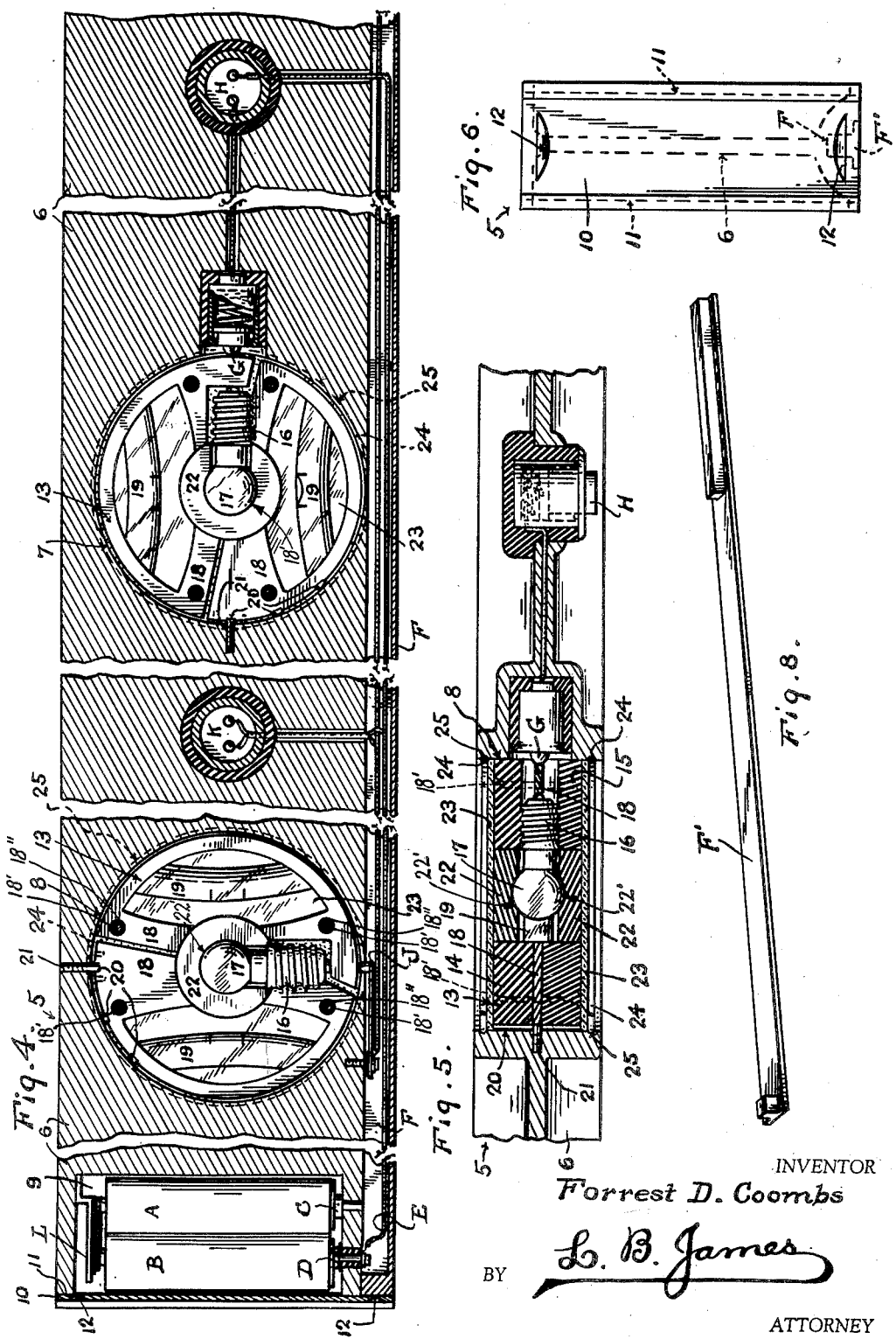
INVENTOR
Forrest D. Coombs
BY L. B. James
ATTORNEY Patented Oct. 21, 1952

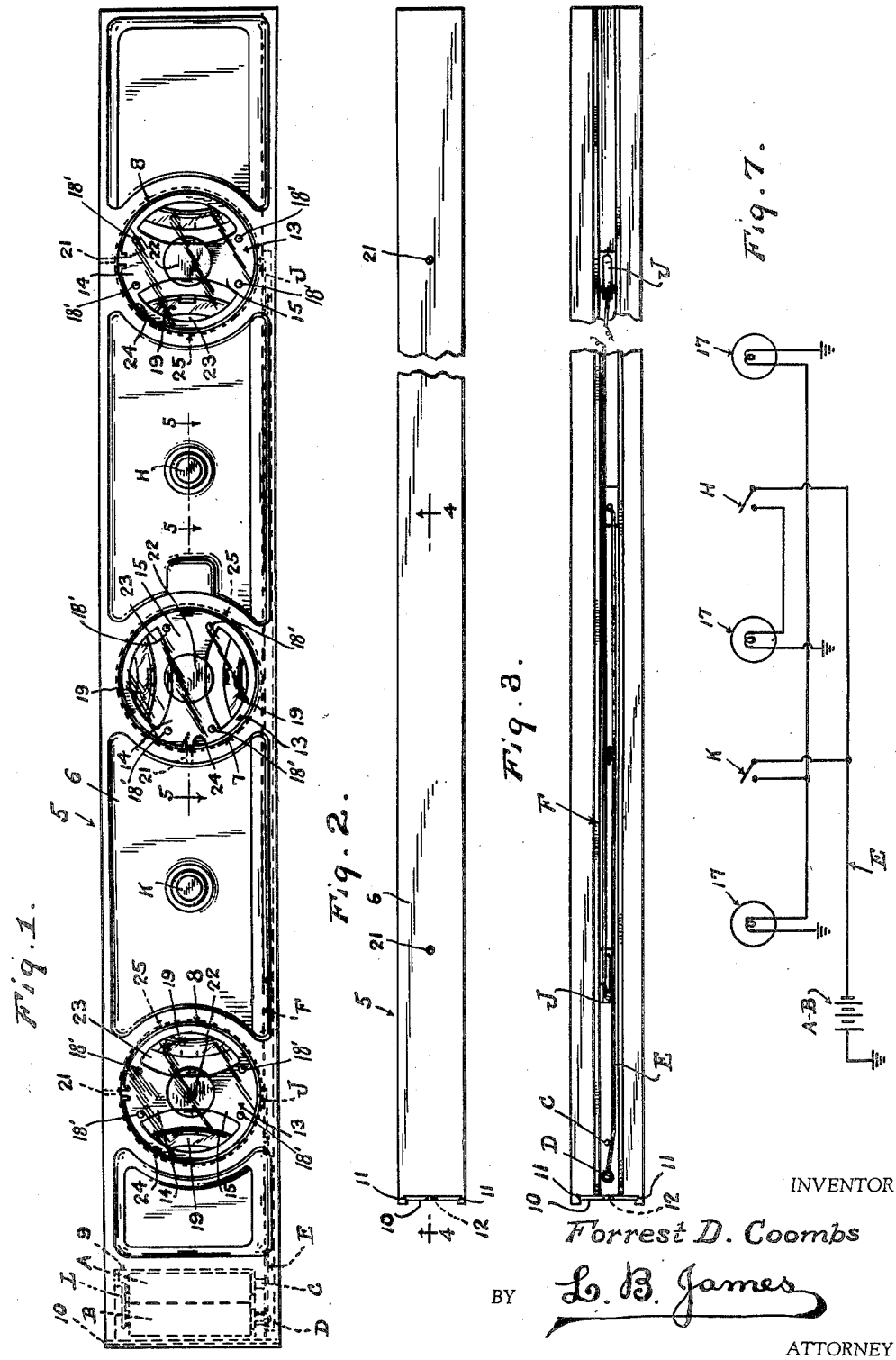

2,615,122

UNITED STATES PATENT OFFICE 2,615,122

ILLUMINATED LEVEL

Forrest D. Coombs, Westwood, Mass.

Application January 20, 1950, Serial No. 139,727

2 Claims. (Cl. 240—6.44)

This invention relates to tools and more particularly a new and novel mechanic's spirit level.

One of the objects of this invention resides in the provision of a mechanic's spirit level adapted to be illuminated so as to permit clear reading of the level tubes thereof.

Another object of this invention resides in the provision of a mechanic's spirit level having its level tubes indirectly illuminated.

A further object of this invention resides in the provision of a mechanic's spirit level consisting of indirectly illuminated levelling units adapted to be removably disposed in the frame thereof.

A still further object of this invention resides in so disposing the illuminated levelling units in the frame of the level that they can be removed and replaced therein without the use of tools.

Aside from the aforesaid objects, this invention resides in the combination of the particularly constructed frame and illuminated levelling units.

One of the salient features of this invention resides in the particular construction of the frame and illuminated levelling units.

Among the many objects of this invention is to so dispose the illuminated units in the frame that they can be adjusted to permit levelling at elected degrees.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Fig. 1 is a side view of the level.

Fig. 2 is a plan view thereof.

Fig. 3 is a bottom view of the level.

Fig. 4 is a longitudinal sectional view taken approximately on line 4—4 of Fig. 2.

Fig. 5 is a horizontal sectional view taken approximately on line 5—5 of Fig. 1.

Fig. 6 is an end view of the level.

Fig. 7 is a diagrammatic view of the lighting circuit.

Fig. 8 is a perspective view of the cover plate for the wire groove.

In the present illustration of this invention, the numeral 5 designates, in general, a mechanic's level consisting of an elongated metal frame 6 of substantially I-beam configuration provided with an enlarged circular hole 7 extending laterally through the center thereof and similarly shaped end holes 8 disposed on opposite sides of the same and extending laterally through the frame adjacent its ends.

Formed in one end of the frame is a battery compartment 9 having a door 10 slidably disposed in grooves 11 in the frame and adapted to be operated by finger engaging notches 12 in its opposite ends.

Removably disposed in the aforesaid battery compartment are small dry cell batteries A and B, the former of which rests on a ground contact C secured to the bottom portion of said compartment while the latter mentioned one rests on a contact D insulated from the metal frame and connected to a strand of electric wire E extending through an elongated groove F in the bottom of the frame and electrically connected to a resilient contact G in the aforesaid center hole by an insulated button switch H and to a resilient contact J in the end holes as by a similar button switch K. Said batteries are retained against the contacts C and D by a resilient contact L secured to the upper wall of the compartment and electrically connecting the upper ends thereof.

Inserted in each of the aforesaid holes 7 and 8 are substantially cylindrical level units 13 formed of dielectric material having opposed lugs 14 and 15 formed on their inner peripheries between which are removably secured, as by electric sockets 16 in the lugs 15, electric light bulbs 17. Said electric sockets 16 are electrically connected to arcuate contacts 18 adapted to engage with the aforesaid contacts G to light the bulbs in their adjusted position within the holes 7 and 8 when the electric circuit is closed by pressing the elected button switch, it being apparent that the end units are simultaneously lighted by one of the switches while the center unit is lighted by the other switch. The aforesaid arcuate contacts are retained between the lugs 14 and 15 by rivets or the like 18' extending through short sleeves 18'' formed of insulating material seated in apertures in the contacts.

Secured in each unit on opposite sides of the electric bulb therein are spirit level tubes 19 while formed in the outer periphery of each unit are circumferentially spaced notches 20 adapted to engage pins 21 extending into the aforesaid holes 7 and 8 to permit adjusting of the units from 0° to 90° relative to the frame, it being the practice in the instant case to dispose the center spirit level tubes on a horizontal plane for adjustment and the end spirit level tubes on a vertical plane for adjustment.

In order to conceal the electric light bulbs and yet permit them to cast rays of light in opposite directions on the level tubes, substantially disc-shaped light shields 22 having substantially semi-spherical sockets 22' in their opposed inner surfaces are inserted between the inner arcuate ends of the aforesaid lugs 14 and 15 the sockets will receive and conceal certain side areas of the bulbs. Said light shields are opaque and made from an insulating material.

With the illuminated level units disposed in the holes 7 and 8 at elected degrees relative to the frame, disc-shaped lenses 23 are rested against the outer sides of the unit and light shields and retained in secure positions within said holes by resilient rings 24 removably secured in annular grooves 25 formed in the walls of the holes inwardly of their opposite ends.

With this invention fully described it is manifest that a mechanic's level is provided whereby the level units thereof are not only interchangeable and adjustable relative to the frame but are illuminated at the will of the mechanic in all adjusted positions without glare to his eyes and through the simplicity of the securing means thereof, assemblage of the same is permitted without tools.

Having thus described my invention, what I claim and desire to protect by Letters Patent is:

1. A mechanic's spirit level comprising, an elongated metal frame having longitudinally spaced enlarged holes extending laterally therethrough and an elongated groove formed in the bottom wall, resilient contacts carried by the frame with their outer ends extending into the aforesaid enlarged holes therein, cylindrical levelling units formed of dielectric material removably and adjustably disposed in said enlarged holes in the frame, light bulb sockets in the units, electric light bulbs removably disposed in said sockets, spirit level tubes in the units on opposite sides of the light bulbs, laterally spaced light shields in the units on opposite sides of the light bulbs and having substantially semi-spherical sockets in their inner opposed surfaces enclosing opposite side portions of the light bulbs, an arcuate contact in the peripheries of the units and electrically connecting the electric sockets therein to the resilient contacts extending into the enlarged holes of the frame, batteries in an end compartment in the frame, an electric circuit including button switches connecting the batteries to the illuminated units, lenses covering opposite sides of the illuminated units, and resilient rings removably disposed in grooves in the walls of the aforesaid enlarged holes and securing the lenses and units therein.

2. A mechanic's spirit level comprising, an elongated metal frame of substantially I-beam configuration having longitudinally spaced enlarged holes extending laterally therethrough, resilient contacts carried by the frame and extending into the aforesaid holes, cylindrical levelling units formed of dielectric material and having notches in their peripheries removably and adjustably disposed in said enlarged holes, pins secured to the frame with their inner ends seated in elected notches in the units, opposed lugs formed on the inner peripheries of the units and having arcuate inner surfaces, electric bulb sockets secured in one of the lugs of each unit, arcuate contacts disposed in the outer peripheries of the units and electrically connecting the sockets with the resilient contacts, batteries removably disposed in an end compartment formed in the frame, a ground contact electrically connecting one of the batteries with the frame, a contact insulated from the frame and supporting the other batteries, electric bulbs removably secured in the electric sockets, insulated button switches secured to the frame on opposite sides of the center unit, an electric wire disposed in a groove in the bottom wall of the frame and electrically connected to one side of the button switches with the other side of one of the switches electrically connected to the center unit and the other side of the remaining switch connected to the end units, light shields removably disposed between the arcuate inner ends of the lugs and partly and tightly enclosing opposite sides of the electric bulbs, spirit level tubes disposed in the units on opposite sides of the electric bulbs and lugs therein, lenses removably disposed in the enlarged holes of the frame and resting against the outer sides of the units and light shields, resilient rings removably seated in annular grooves in the walls of the enlarged holes and removably securing the lenses and units therein, and a slidable door over the battery compartment of the frame.

FORREST D. COOMBS.

REFERENCES CITED

The following references are of record in the file of this patent:

UNITED STATES PATENTS

| Number | Name | Date |
|---|---|---|
| 875,462 | Rowan | Dec. 31, 1907 |
| 1,036,601 | Frank | Aug. 27, 1912 |
| 1,110,456 | O'Brien | Sept. 15, 1914 |
| 1,172,971 | Frank | Feb. 22, 1916 |
| 1,583,489 | Perrine | May 4, 1926 |
| 1,818,843 | Dill | Aug. 11, 1931 |
| 2,495,646 | Schultes et al. | Jan. 24, 1950 |